(12) United States Patent
Yamaguchi et al.

(10) Patent No.: US 7,970,975 B2
(45) Date of Patent: Jun. 28, 2011

(54) SECURE MODULE RECORDER SYSTEM AND METHOD

(75) Inventors: Toshimitsu Yamaguchi, Irvine, CA (US); Lawrence J. Klementowski, Placentia, CA (US); Timothy A. Dye, New Milfort, CT (US); Mattias E. Nilsson, Huntington Beach, CA (US); Masakazu Sekine, La Habra Heights, CA (US)

(73) Assignee: Sekai Electronics, Inc., La Mirada, CA (US)

( * ) Notice: Subject to any disclaimer, the term of this patent is extended or adjusted under 35 U.S.C. 154(b) by 213 days.

(21) Appl. No.: 11/828,306

(22) Filed: Jul. 25, 2007

(65) Prior Publication Data

US 2009/0027795 A1    Jan. 29, 2009

(51) Int. Cl.
*G06F 13/00* (2006.01)
*G06F 3/00* (2006.01)

(52) U.S. Cl. ............ 710/303; 710/21; 710/69; 386/213; 386/216; 386/232; 386/234; 715/716; 715/717; 715/721; 725/78; 725/115; 725/139

(58) Field of Classification Search .................... None
See application file for complete search history.

(56) References Cited

U.S. PATENT DOCUMENTS

| | | | | |
|---|---|---|---|---|
| 6,064,721 | A * | 5/2000 | Mohammadian et al. | 379/21 |
| 6,767,253 | B1 * | 7/2004 | Werner et al. | 439/638 |
| 2003/0081935 | A1 * | 5/2003 | Kirmuss | 386/46 |
| 2007/0180166 | A1 * | 8/2007 | Southerland et al. | 710/65 |
| 2008/0085031 | A1 * | 4/2008 | Estevez et al. | 382/100 |

FOREIGN PATENT DOCUMENTS

GB           2129773      *  5/1984

\* cited by examiner

*Primary Examiner* — Eron J Sorrell
*Assistant Examiner* — Dean Phan
(74) *Attorney, Agent, or Firm* — Bernard L. Kleinke; Duckor Spradling Metzger & Wynne

(57) ABSTRACT

Embodiments of a secure module recorder system and method for securing recording and storing of information is provided. The system may include at least one secure module and a docking station having at least one receptacle for holding one of the secure modules. The secure module may include a tamper-resistant case, an input port for receiving an analog signal, a recording circuit for converting the analog signal into digitally formatted data, a memory device for storing the digitally formatted data, a playback circuit for reading the digitally formatted data from the memory device and converting the digitally formatted data into an analog playback signal, and an output port for transmitting the analog playback signal. The docking station may further include a first interface for receiving the analog signal from an external device and a second interface disposed within the receptacle for interfacing with the input port of the secure module.

13 Claims, 8 Drawing Sheets

US 7,970,975 B2

SECURE MODULE RECORDER SYSTEM AND METHOD

FIELD OF THE INVENTION

The present invention relates in general to a signal recorder. It more particularly relates to a secure module recorder system.

BACKGROUND ART

This section describes the background of the disclosed embodiment of the present invention. There is no intention, either express or implied, that the background art discussed in this section legally constitutes prior art.

Audio and/or video recorders are currently widely used by many members of the population for a variety of uses. One of the more specialized uses is to record information that may later be used as evidence. The integrity of these recordings should be reliable to allow them to be used as evidence. Currently, the current popular methods of recording audio and/or video are either digitally or on tape. Both of these methods may have integrity issues because the storage media may be easily accessible. With the digitally formatted information, the information is stored in a memory device that may be easily downloaded to a personal computer allowing the user to directly modify the information, then reload the memory device. With the information recorded on tape, the tape may be accessible for the recording and/or playback equipment, so that the tape may be selectively recorded over. The ability to directly modify the storage media places the integrity of these devices into question and increases the possibility that they would not be allowed into evidence.

BRIEF DESCRIPTION OF THE DRAWINGS

The features of this invention and the manner of attaining them will become apparent, and the invention itself will be best understood by reference to the following description of certain embodiments of the invention taken in conjunction with the accompanying drawings, wherein.

DESCRIPTION OF CERTAIN EMBODIMENTS OF THE INVENTION

Figure 1:
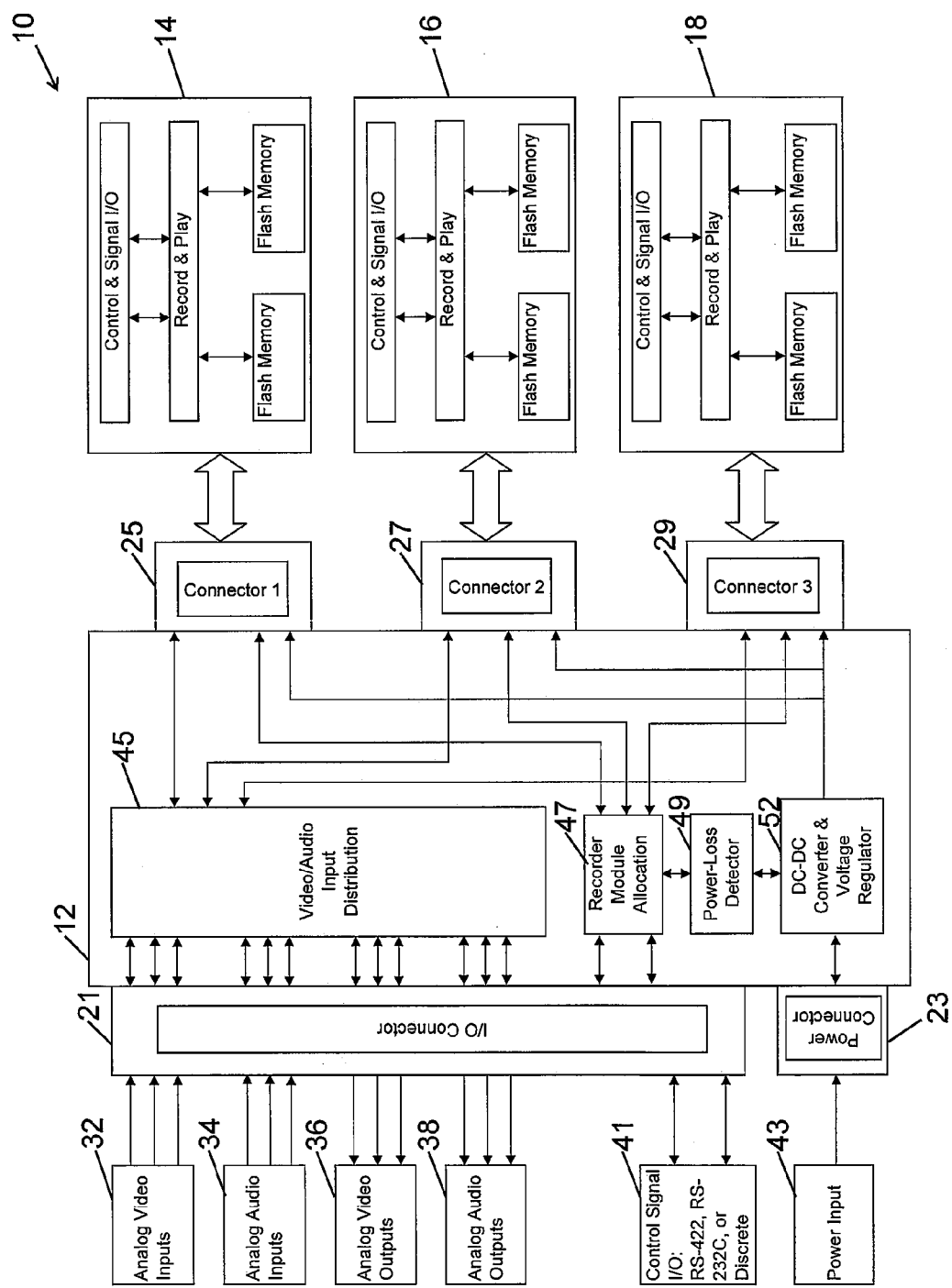
FIG. 1 is a block diagram secure module recorder system including a docking station and a plurality of secure modules according to an embodiment of the present invention.

It will be readily understood that the components of the embodiments as generally described and illustrated in the drawings herein, could be arranged and designed in a wide variety of different configurations. Thus, the following more detailed description of the embodiments of the system, components and method of the present invention, as represented in the drawings, is not intended to limit the scope of the invention, as claimed, but is merely representative of the embodiments of the invention.

According to certain embodiments of the invention, there is provided a secure module recorder system including a docking a station, a secure module, and a playback accessory. The docking station may provide power to the secure module and may serve as an input/output interface for control and audio/video signals. The secure module may contain digital memory devices and all components for recording and playing back the audio/video signals. The secure module may be completely sealed and tamper proof and with only analog audio/video inputs and outputs may be secure from manipulation. The playback accessory may be a single cable audio/video outputs and a power transformer. The cable may be connected to the secure module, AC or DC power, and a television monitor to playback the information digitally stored on the secure module.

According to another embodiment of the invention, there is provided a secure module for storing of information. The secure module may include a tamper-resistant case, an input port for receiving an analog signal within the case, a recording circuit disposed within the case for converting the analog signal into digitally formatted data, a memory disposed within the case for storing the digitally formatted data, a playback circuit disposed within the case for converting the digitally formatted data into an analog playback signal, and an output port for transmitting the analog playback signal outside the case.

According to yet another embodiment of the invention, there is provided a system for securely storing information. The system may include at least one secure module and a docking station having at least one receptacle for holding one of the secure modules. The secure module may include a tamper-resistant case, an input port for receiving an analog signal within the case, a recording circuit disposed within the case for converting the analog signal into digitally formatted data, a memory device disposed within the case for storing the digitally formatted data, a playback circuit disposed within the case for reading the digitally formatted data from the memory device and converting the digitally formatted data into an analog playback signal, and an output port for transmitting the analog playback signal outside the case. The docking station may further include a first interface for receiving the analog signal from an external device and a second interface disposed within the receptacle for interfacing with the input port of the secure module.

According to still another embodiment of the invention, there is provided a method of securely storing a signal. The method may include receiving an analog signal within a tamper-resistant module, converting the analog signal to digitally formatted data within the module, storing the digitally formatted data in a memory device within the module, reading the digitally formatted data from the memory device within the module, converting the digitally formatted data to a playback analog signal within the module, and transmitting the playback analog signal outside the module to a display device.

Referring now to the FIG. 1, there is shown a secure module recorder system 10, which facilitates the secure recording of audio and video signals, and which is constructed according to an embodiment of the present invention. The secure module recorder system 10 may include a docking station 12 and a plurality of secure modules 14, 16, and 18. The system 10 may be ruggedly constructed to operate in harsh environments, such as in aircraft, ground vehicles, watercraft, submarines, or the like. Cameras, microphones, or other audio/video equipment may provide a plurality of analog audio and video input signals to the secure module recorder system for recording. The secure module recorder system may provide a plurality of analog audio and video output signals to monitors, speakers, or other audio/video equipment. Control signals may also be sent between the secure module recorder system and a control panel or other equivalent device to control the recording of the information and to provide status and other information to an operator.

Information, such as the audio and video input signals, may be stored on the secure modules when they are connected to the docking station, and each secure module may have the capability to playback the stored information without being connected to the docking station.

The docking station 12 may include an input/output (I/O) connector 21, a power connector 23, and a plurality of module connectors 25, 27, and 29. Analog video input signals 32, analog audio input signals 34, analog video output signals 36, analog audio output signals 38, and control signals 41 may be communicated through I/O connector 21. Input power 43 may be provided to the power connector 23. The secure modules 14, 16, 18 may be connected to the docking station via module connectors 25, 27, 29; respectively.

An audio/video (A/V) distribution circuit 45 disposed within the docking station 12 may distribute the audio and video signals between the I/O connector 21 and the module connectors 25, 27, 29. For the docking station 12 adapted for use with three secure modules 14, 16, 18, the A/V distribution circuit 45 may distribute difference signals simultaneously to each of the secure modules, distribute the same signals to one or more of the secure modules, distribute signals to only one secure module at a time, or distribute signals in some other appropriate pattern.

A recorder module allocation circuit 47 disposed within the docking station 12 may receive control signals from the I/O connector 21, interpret these control signals, provide a distribution control signal to the A/V distribution circuit 45 to control the distribution of the analog signals to the module connectors, and provide appropriate module control signals to each of the module connectors 25, 27, 29. The recorder module allocation circuit 47 may also receive status and other signals from the secure modules via the module connectors, interpret these signals, and transmits appropriate output control signals to the I/O connector 21.

The recorder module allocation circuit 47 may also determine which secure module 14, 16, 18 receives incoming control signals 41. The docking station 12 may have only one set of serial control lines for control signals 41. When the recorder module allocation circuit 47 receives a block of serial communication, it may determine which of the secure modules 14, 16, 18 needs to communicate with the incoming communication. This action may eventually control the distribution of the audio and video signals to the secure modules 14, 16, 18.

A converter and voltage regulator circuit 52 disposed within the docking station 12 may received input power provided to the power connector 23, convert the voltage of the input power to the appropriate voltage for module power, regulate the module power to maintain a constant voltage level, and provide the regulated module power to each of the module connectors. The converter portion of the circuit 52 may be either a DC-DC converter or an AC-DC depending on the type of the input power.

A power-loss detector circuit 49 disposed within the docking station 12 may received signals from the recorder module allocation circuit 47 and the converter and voltage regulator circuit 52, analyze these signals, and provide appropriate status signals back to the recorder module allocation circuit 47 and the converter and voltage regulator circuit 52 regarding the health of the input power and the module power. When a complete power loss is sensed by the power-loss detector circuit 49 during a record mode, the power-loss detector circuit 49 may send a stop command to the appropriate secure module 14, 16, 18 to end its recording. This action may allow the secure module 14, 16, 18 to conclude its recording operation without any damage or loss to the previously recorded data and the memory device. Without this action the previously recorded data may be damaged, much like damage done to the data on a personal computer when it is unplugged without first executing an appropriate shutdown procedure.

Figure 2:
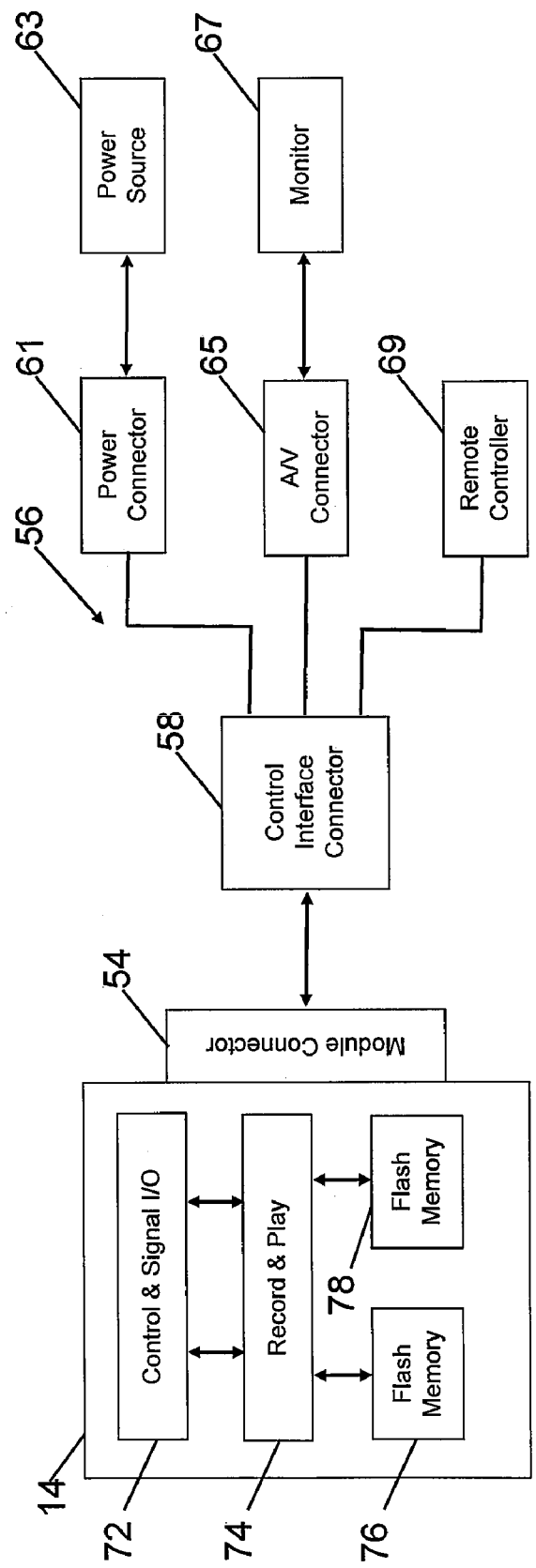
FIG. 2 is a block diagram of one of the secure modules of FIG. 1 with accessories for the playback of stored data.

Referring now to FIG. 2, there is shown one of the secure modules removed from the docking station and configured to playback the stored information. In playback configuration, the secure module 14 may be connected at a module connector 54 to a cable assembly 56. The cable assembly 56 may include a control interface connector 58 connected to module connector 54, a power connector 61 connected to a power source 63, an audio/video connector 65 connected to a monitor 67, and a remote controller 69. The monitor 67 may include a video monitor and/or a audio amplifier. The remote controller 69 may transmit control signals through the control interface connector 58 to the module connector 54 of the secure module 14 to control the playback of the stored information.

The secure module 14 may include a control and signal input/output circuit 72, a record and play circuit 74, and memory, shown as flash memory boards 76, 78. The control and signal I/O circuit 72 may receive and transmit controls and analog signals from and to the module connector 54. The control and signal I/O circuit may also transmit and receive controls and analog signals to and from the record and play circuit 74. The record portion of the record and play circuit 74 may convert the received analog signals into digitally formatted data using an analog-to-digital converter and store this digitally formatted data onto the memory 76, 78. The play portion of the record and play circuit 74 may read the digitally formatted data from the memory 76, 78 and convert this digitally formatted data into an analog signal using a digital-to-analog converter.

Figure 3:
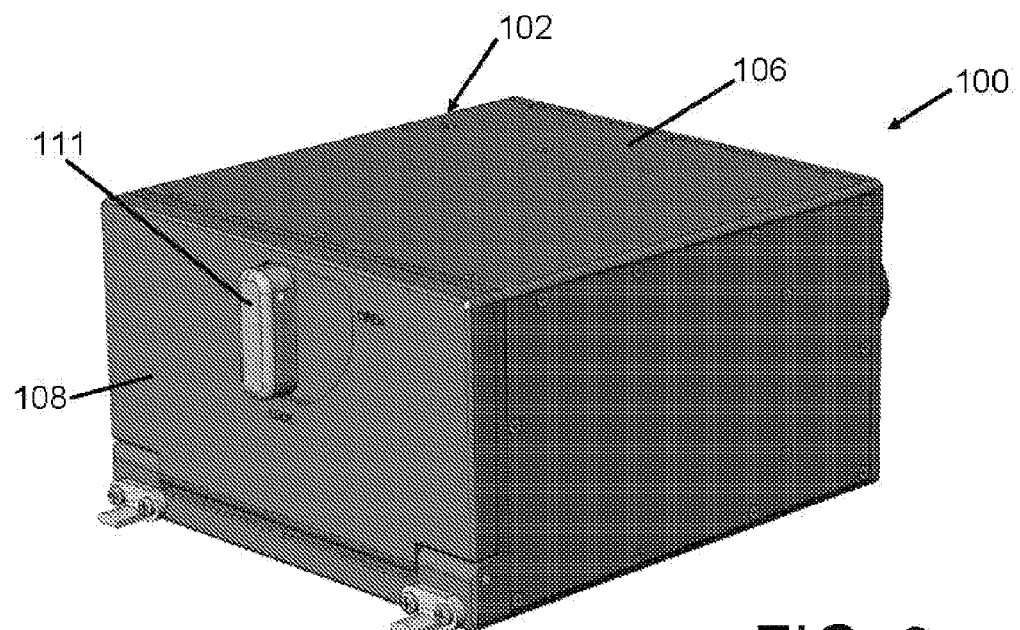
FIG. 3 is a front pictorial view of a ruggedized docking station according to an embodiment of the present invention.
Figure 4:
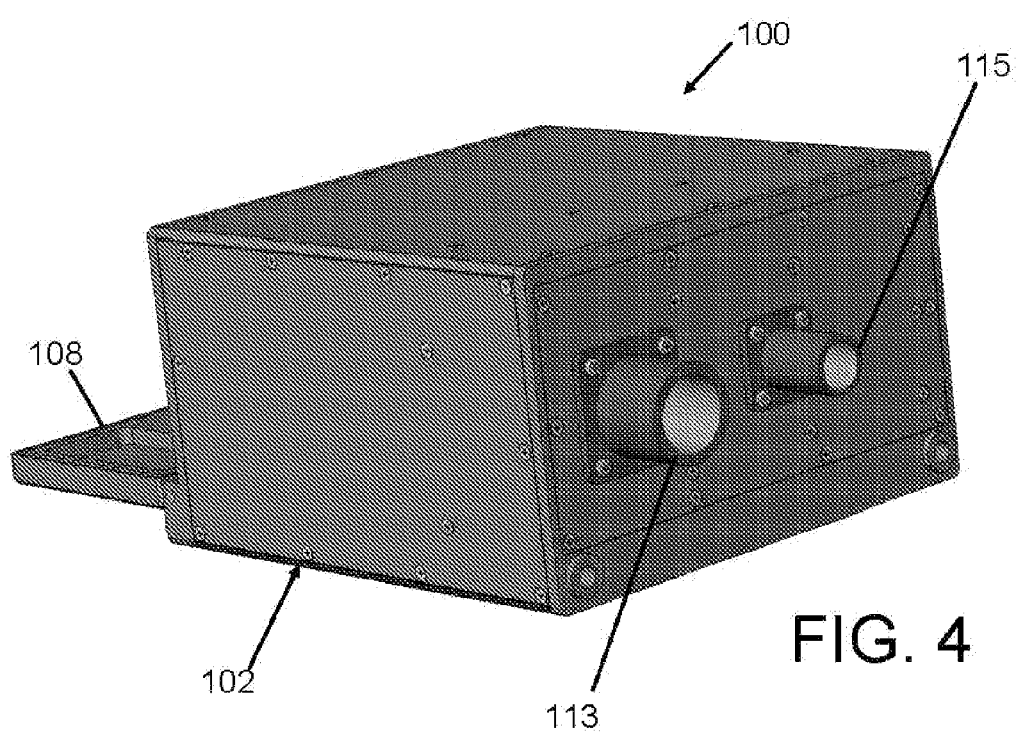
FIG. 4 is a back pictorial view of the docking station of FIG. 3.

Referring now to FIGS. 3-6, there is shown an embodiment of a secure module recorder system, generally referenced as 100, which is configured for rugged use, such as in an aircraft or some other moving vehicle, and which is constructed according to an embodiment of the invention. The secure module recorder system may include a docking station 102 and at least one secure module 104. The docking station 102 may include a ruggedized container 106 having a door 108 capable of being locked with a lever 111. With the lever 111 in the "LOCK" position as shown in FIG. 3, the lever may be rotated to the "OPEN" position to enable the door 108 to be opened. The back of the ruggedized container 106 may include an input/output connector 113 for transmission of signals into and out of the docking station 102 and a power connector 115 for providing power to the docking station 102.

Figure 5:
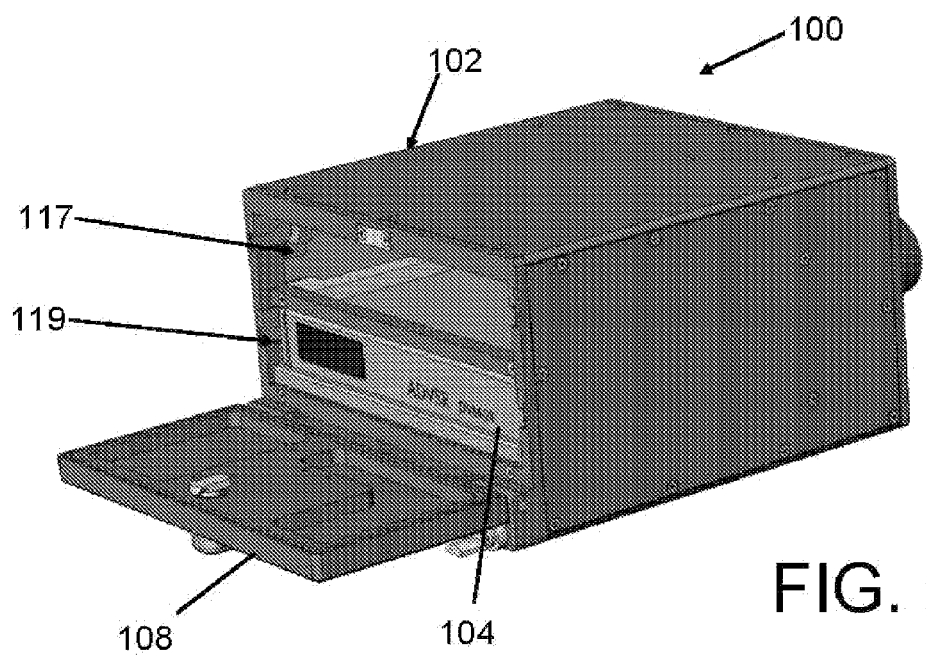
FIG. 5 is a side pictorial view of the docking station of FIG. 3 with the door opened.
Figure 6:
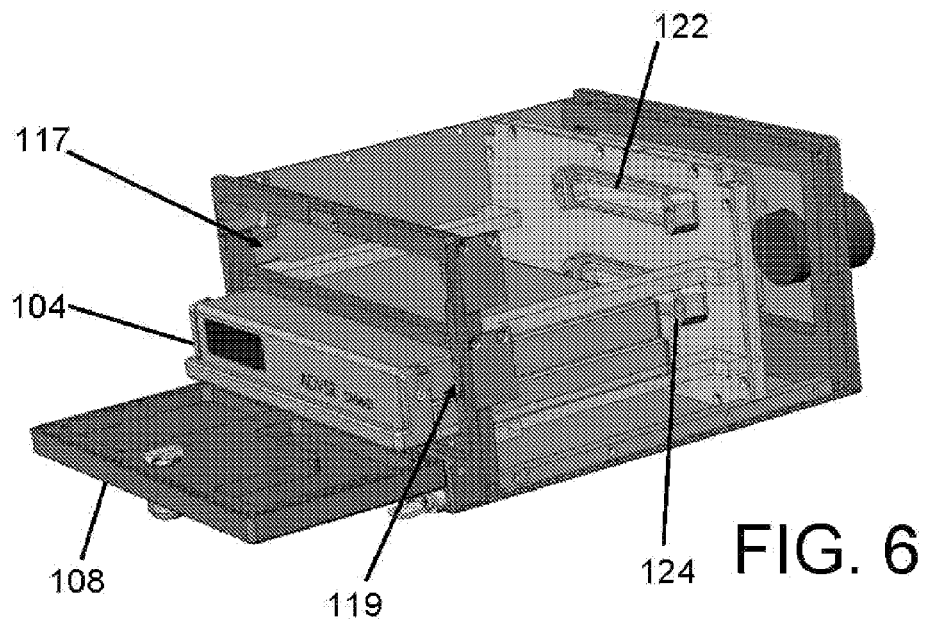
FIG. 6 is a side pictorial view of the docking station of FIG. 3 with a top and a side panel removed and the secure module partially inserted.

With the door 108 open as shown in FIG. 5, the docking station 102 may include a pair of receptacles 117, 119. These receptacles 117, 119 may each accept a secure module, such as secure module 104 disposed fully into the receptacle 119. The receptacles 117, 119 may include module connectors 122, 124, respectively, for communicating with inserted secure modules, as shown in FIG. 6 with a top and side panel removed from the docking station 102, the door 108 open, and the secure module 104 partially removed. These module connectors 122, 124 may provide all applicable signals between the docking station 102 and any inserted secured modules, such as input/output signals, control signals, and power signals.

Figure 7:
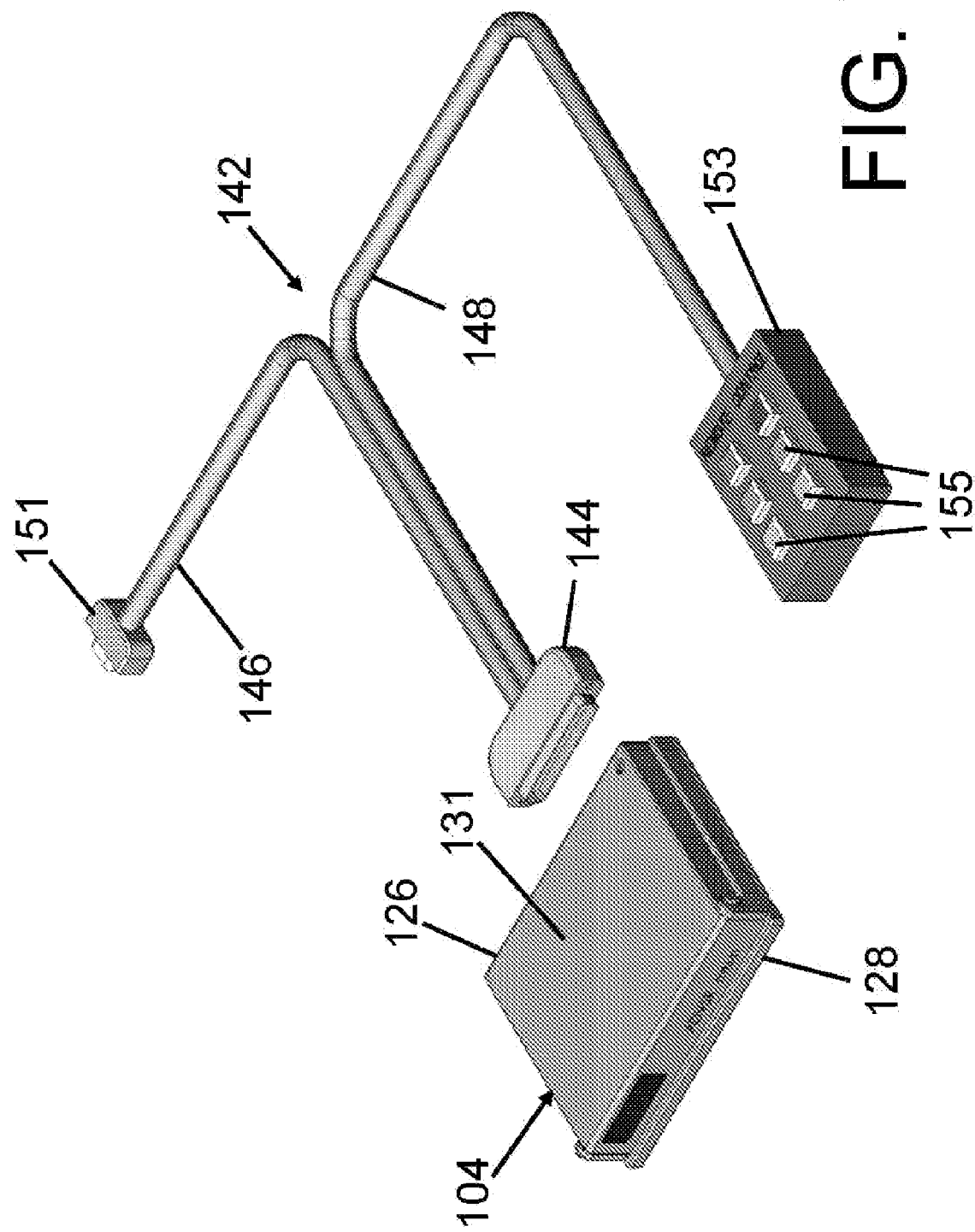
FIG. 7 is a pictorial view of the secure module of FIG. 5 and a playback accessory.
Figure 8:
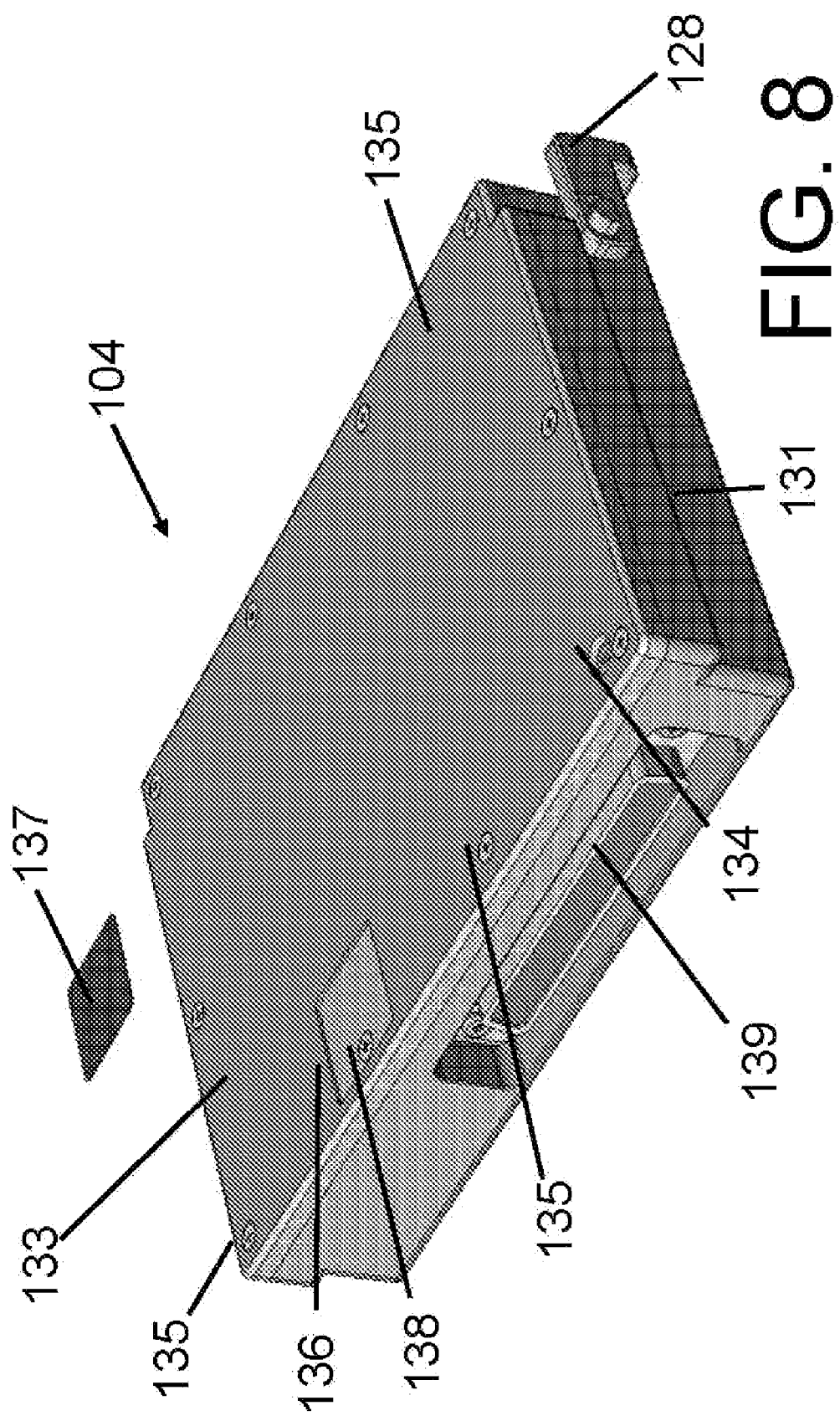
FIG. 8 is a bottom pictorial view of the secure module prior to applying a tamper evident seal.
Figure 9:
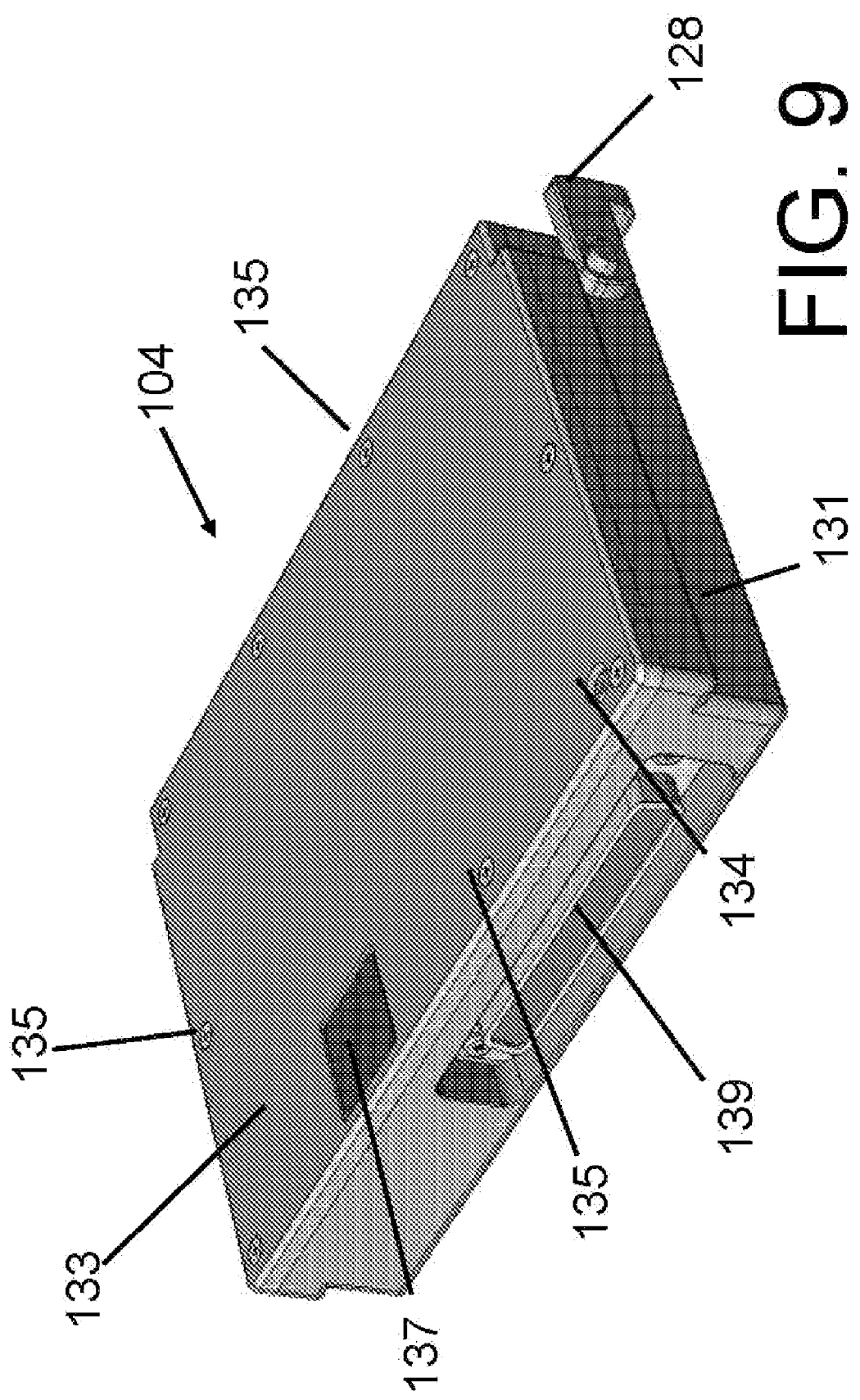
FIG. 9 is a bottom pictorial view of the secure module with the tamper evident seal applied.

Referring now to FIGS. 7-9, there is shown the secure module 104 removed from the docking station. The secure module 104 may include a ruggedized case 126 having a handle 128 to assist with removing the secure module 104 from the docking station. The ruggedized case 126 may include a main portion 131 for containing the electronics of the secure module 104 and a closure portion 133. The closure portion 133 may be attached to the main portion with a plurality of fasteners 135 and a rivet 134. The rivet 134 may have to be destroyed in order to remove the closure portion 133 from the main portion 131.

The closure portion 133 may also include an indented portion 136 around one of the fasteners, such as fastener 138, to allow the fastener 138 to be covered with a tamper evident seal 137. The indented portion 136 may allow the tamper evident seal 137 when applied to the closure portion 133 to be even with or below the outer surface of the closure portion 133 to prevent the tamper evident seal 137 from catching on things, such as the receptacle of the docking station. The tamper evident seal 137 along with the rivet 134 may reveal if the closure portion 133 had been removed to identify access to and potential tampering with the electronics of the secure module 104.

A module connector 139 may be included at the back of the secure module 104 for connection with of the module connectors 122, 124 of the docking station depending on the receptacle 117, 119 the secure module 104 is inserted into. All communication into and out of the secure module 104 including power may be routed through module connector 139.

FIG. 7 also shows an accessory, generally referenced as 142, for playback of the information on the secure module 104. The accessory 142 may include a module connector 144 for connection with the module connector 139 of the secure module 104. At least two cables 146, 148 may extend from the module connector 144. The first cable 146 may connect to an input/output and power connector 151 for supplying power to secure module 104 and providing the analog out signals to an external monitor (not shown). The input/output and power connector 151 may include separate connectors for the input/output signals and the power signals. The second cable 148 may connect to a remote control device 153 for controlling the playback of the information stored in the secure module 104. The remote control device 153 may include a plurality of switches, such as pushbuttons 155, to provide control signals to the secure module 104 to control the various playback functions, such as play, stop, fast reverse, fast forward, pause, etc.

Figure 10:
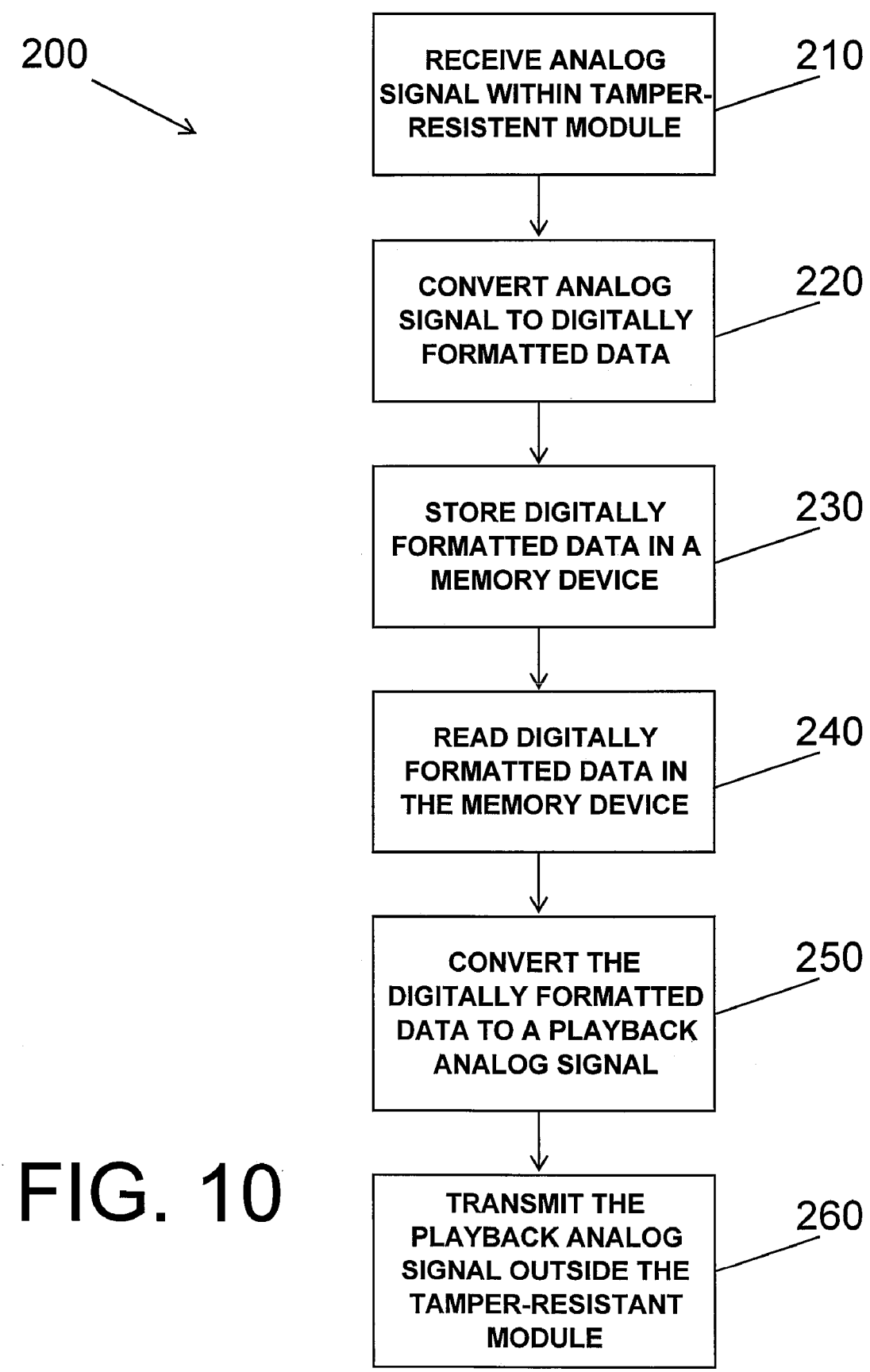
FIG. 10 is a flow diagram of a method of securing recording a signal according to another embodiment of the present invention.

Referring now to FIG. 10, a method of securing recording information is shown and generally referenced as 200. The method 200 may be initiated by the receipt of an analog signal containing the desired information to be recorded within a tamper-resistant secure module at step 210. Next at step 220, the analog signal may be converted into digitally formatted data within the secure module. The digitally formatted data may then be stored in a memory device located within the secure module at step 230. The digitally formatted data may include tamper evident data, such as a time stamp or a digital watermark.

The playback of the recorded information may begin at step 240 by reading the digitally formatted data stored on the memory device located within the secure module. This digitally formatted data may then be converted at step 250 into a playback analog signal within the secure module. At step 260 the playback analog signal may be transmitted outside the secure module to a monitor or some other suitable playback equipment.

While particular embodiments of the present invention have been disclosed, it is to be understood that various different embodiments are possible and are contemplated within the true spirit and scope of the appended claims. There is no intention, therefore, of limitations to the exact abstract or disclosure herein presented.

What is claimed is:

1. A system for securely storing information and conveying it to a monitor, comprising:
    at least two removable secure modules each including
        a tamper-resistant case having a plurality of fasteners,
        a tamper evident seal to cover at least one of the fasteners of the tamper-resistant case,
        an input port to receive an analog input signal within the case,
        a recording circuit disposed within the tamper-resistant case to convert the analog signal into digitally formatted data,
        a memory device disposed with the tamper-resistant case responsive to the recording circuit to store the digitally formatted data,
        a playback circuit disposed within the tamper-resistant case to read the digitally formatted data from the memory device and to convert the digitally formatted data into an analog playback signal,
        an output port to transmit the analog playback signal outside the case;
    a docking station having at least two receptacles configured to hold the secure modules and to communicate with the input ports of the secure modules;
    a distribution circuit configured to distribute the analog input signal via the receptacles to the secure modules simultaneously, and to distribute different analog input signals simultaneously to each one of the secure modules via the receptacles, and to distribute the analog input signals to only one of the secure modules via the receptacles;
    an accessory having a module connector to attach to the output port of one of the secure modules when it is removed from the docking station, and having one power cable to supply electrical power to said one of the secure modules to power it as a stand alone unit, the accessory having another cable to connect to the monitor and still another cable to connect to a remote control unit; and
    wherein the recording circuit adds digital watermark within the digitally formatted data being converted.

2. The system according to claim 1, wherein the docking station includes an allocation circuit adapted to receive at least one control signal and provide a control input to the distribution circuit to determine the desired one or more of the secured modules to receive the received signal via the distribution circuit and having
    a first interface to receive the analog signal from an external device; and
    second interfaces disposed within the receptacles to interface with the input ports of the secure modules.

3. The system according to claim 1, wherein the recording circuit includes an analog-to-digital converter.

4. The system according to claim 1, wherein the playback circuit includes a digit-to-analog converter.

5. The system according to claim 1, wherein the case is suitable for use in a harsh environment.

6. The system according to claim 1, wherein the secure module further includes an input/output circuit to receive the signal from the input port and to transmit the playback analog signal to the output port.

7. The system according to claim 2, wherein the input port and the output port are included on a single input/output connector for the secure module.

8. The system according to claim 7, wherein the input/output connector for the secure module is adapted to connect with the second interface of the docking station.

9. The system according to claim 1, wherein the docking station includes an audio/video distribution module.

10. The system according to claim 1, wherein the docking station includes a secure module allocation module.

11. The system according to claim 1, wherein the docking station includes a power loss detector module.

12. The system according to claim 1, wherein the docking station includes a voltage converter and regulator module.

13. The system according to claim 1, wherein the recording circuit adds a time stamp within the digitally formatted data being converted.

* * * * *